United States Patent [19]
Hughes et al.

[11] 3,779,793
[45] Dec. 18, 1973

[54] SCALE CONTROL
[75] Inventors: James W. Hughes; Thomas E. Sample, Jr.; Jack F. Tate, all of Houston, Tex.
[73] Assignee: Texaco Inc., New York, N.Y.
[22] Filed: Dec. 20, 1971
[21] Appl. No.: 210,137

[52] U.S. Cl.............. 117/72, 117/75, 117/123 D, 117/124 E, 117/132 B, 117/161 KP, 252/180, 260/77.5 TB
[51] Int. Cl. ................. C23f 15/00, B32b 27/40
[58] Field of Search ............... 260/77.5 TB; 117/161 KP, 72, 75, 132 B; 252/180, 82

[56] References Cited
UNITED STATES PATENTS

| | | | |
|---|---|---|---|
| 3,425,973 | 2/1969 | Shaw | 117/161 KP X |
| 3,626,023 | 12/1971 | Brizgys | 117/161 KP X |
| 3,499,783 | 3/1970 | Nelson et al. | 117/72 |
| 3,095,862 | 7/1963 | Berner | 252/180 X |

*Primary Examiner*—Ralph Husack
*Attorney*—Thomas H. Whaley et al.

[57] ABSTRACT

This invention concerns methods of imparting properties of scale resistance to surfaces upon which adherent scale is normally prone to form during contact with mineralized waters through the use of novel, polyurethane-type resins, characterized by containing pendant polyoxyalkylene chains attached to a basic polyurethane skeletal network wherein the polyurethane is formed utilizing a blocked isocyanate.

18 Claims, No Drawings

SCALE CONTROL

This application is related to our copending application Ser. No. 296,399, filed Oct. 10, 1972 which is a Continuation-in-Part of application Ser. No. 141,892, filed May 10, 1971, now abandoned.

This invention concerns methods of inhibiting and/or controlling mineral-scale formation upon surfaces which are normally susceptible to scale formation during contact with mineralized waters.

More particularly, this invention concerns the production of scale-resistant coatings and articles through the use of novel resins of the polyurethane type characterized by having as integral parts of their molecular structure "pendant" polyoxyalkylene chains; "pendant" polyoxyalkylene chains being defined herein as polyoxyalkylene chains which are attached by primary chemical bonds at one end only to the polymeric skeletal network.

Mineralized or "hard" waters as defined throughout this application are waters containing in solution alkaline earth and/or iron compounds which upon alteration of environmental conditions are prone to deposit mineral scale therefrom on surfaces contacting them.

BACKGROUND OF THE INVENTION

Inorganic mineral scale concretion or the deposition of scale coatings derived from the extended contact of surfaces normally susceptible to scale formation with hard waters, particularly waters containing alkaline earth and/or iron compounds, is both wasteful and commonplace. While scale formation upon metal surfaces presents the more serious problem, non-metallic surfaces including ceramics, glasses and organic polymers may also undergo scaling.

Particularly troublesome are the tenacious "furs" or "crusts" that form in operational processing equipment in continuous and/or prolonged contact with aqueous solutions of inorganic salts as, for example, alkaline earth sulfates, carbonates and bicarbonates. This type of scale formation creates serious problems for the petroleum and gas-producing industries, where the build-up of undesirable inorganic mineral scale deposits can take place in equipment or tubing of difficult or limited accessibility. These include flow lines in both surface and subterranean locations, including auxiliary producing equipment, such as heaters, pumps, valves, rods, and the like. In addition, scale formation can also cause substantial problems in the chemical processing industries, public utilities, and in other situations where mineral-laden water is processed or used, as in heat exchangers, storage vessels, piping, reactors, evaporators, and the like.

Several different explanations have been advanced as to how the formation of mineral scale deposits, such as for example calcium or barium sulfate, takes place. One mechanism leading to scale formation comes about from the mingling of a fluid stream containing a substantial concentration of an anion or cation with another stream containing antagonistic counter ions. An illustration of this mechanism would be a case in which one process stream containing a soluble calcium compound contacts another stream containing a soluble sulfate compound to cause precipitation of calcium sulfate. Should the mixing of such incompatible waters take place in a well bore, the result may be deposition of a crust of calcium sulfate which, if allowed, can build up on the surface of submerged equipment such as tubing, and may even choke off fluid flow by diminution of utilizable diameter unless corrective descaling measures are undertaken. In the case of heat exchange equipment, the mineral scale deposition insulates the equipment from the source or sink of heat and increases the cost of operation and may cause extensive maintenance or down-time and increased operational costs.

Another cause of mineral scale formation arises from aqueous solutions of inorganic materials having an inverse solubility curve, that is, a solubility which decreases as the temperature increases. An excellent example of this is calcium sulfate, whose solubility in water decreases with increased temperature. In these instances the solution immediately adjacent to the heating surface reaches saturation the most quickly, dropping calcium sulfate at this juncture which is held tenaciously to the heating surface.

Yet another cause of scale formation is attributable to precipitation of scale material from supersaturated solutions, of which the preceding example is a special case. When temperature and/or pressure changes occur, or the concentration of some solubilizing substances is substantially decreased, this change of conditions can result in scale formation on the tubing or other equipment being operated.

Whatever the reason or reasons for scale formation may be, as outlined above, it is a troublesome and expensive process that can lead to costly, unscheduled maintenance and even to the breakdown of operational units. For these reasons, a number of remedial measures have been resorted to, both for the removal of scale and mitigation of its formation.

Scale is ordinarily removed by either chemical or mechanical methods, or a combination of both methods. In chemical descaling procedures, the problem is to find a material that will dissolve or loosen the mineral scale without attacking the underlying substrate.

Inhibited hydrochloric acid has proved useful in instances where the scale is acid soluble, as is the case with calcium carbonate scale. Unfortunately, however, many mineral scales, such as those of calcium and barium sulfates, are not appreciably soluble in acids: Calcium sulfate scale can sometimes be dissolved or loosened by treatment with ammonium salts, polyphosphates, or hydroxides, often followed by acid washing.

Mechanical descaling procedures are often resorted to employing such devices as scrapers, brushes, high-pressure abrasive jets, and the like, but these methods are tedious, expensive, and of restricted applicability.

In view of the numerous difficulties inherent in removal by whatever means of mineral scale once formed, the use of scale-preventive methods has been widely practiced for many years. The addition of chemical "scale inhibitors" such as phosphates, both organic and inorganic, tannin materials, chelating agents, natural and synthetic polymers, and the like to scale-prone systems is therefore old in the art. However, the use of such scale inhibitors also suffers serious shortcomings, the most notable being (1) the necessity of maintaining them at constant critical levels of concentration in the systems being protected, (2) the absence of chemical scale inhibitors which provide protection under a diversity of scaling conditions, (3) their general thermal lability and (4) their tendency after prolonged usage to themselves induce the formation of insoluble deposits.

As a consequence of the many problems, as outlined in brief above, which are encountered in methods of removing scale already deposited, as well as in the methods of scale prevention as currently practiced, a novel and efficient means is taught by the instant invention whereby the deposition and/or adherence of mineral scale from hard waters upon surfaces may be mitigated or prevented by virtue of a novel protective coating which is at once long lived, environmentally stable, requires little maintenance, and is broad in applicability.

Various types of protective "plastic" coatings including those based on polyurethane resin formulations are commonly applied to metal surfaces subject to service in contact with corrosive aqueous environments to prevent corrosive attack; however, both laboratory and in-service performance tests have given evidence that these coatings, while affording effective protection against corrosive attack on the metal, are not substantially less prone to scale build-up in the frequently encountered situation where the corrosive environment is also conducive to scale deposition.

It should be noted that the coatings of the instant invention are not restricted in applicability simply to metallic surfaces, which may be susceptible both to corrosion and scaling, but are also applicable to non-metallic surfaces which may be inherently resistant to corrosion but scale-prone, such as glass, ceramics, organic polymeric materials, and the like.

In view of the foregoing evidence, it was unexpected to find that conventional, scale-prone, polyurethane-derived protective resins, even those originally compounded with a polyether polyol as the reactive hydroxylic component, if modified in their formulation so as to contain in the finished or "cured" resin pendant polyoxyalkylene chains, will become resistant to mineral scale deposition and/or adherence.

Thus, it is a broad object of this invention to provide novel, modified polyurethane resin coatings which when applied to metallic or nonmetallic substrates normally susceptible to the build-up of scale, greatly inhibit scale deposition and/or adherence thereon as compared to the uncoated substrate.

A further and more specific object of this invention is to provide processes whereby the scale-susceptibility of scale-prone surfaces is substantially lowered by application thereto of novel, modified polyurethane-type resins which possess scale inhibitory properties, and curing said resins on the said surfaces.

Yet a further and more specific object of this invention is to provide compositions of novel, modified polyurethane resins containing pendant polyoxyalkylene chains and having substantial resistance to scale deposition and/or aherence thereon.

Yet another object of this invention is to attain the above enumerated objects with a polyurethane type resin having only one component which may be applied and subsequently cured. Our copending application Ser. No. 141,892 filed May 10, 1971 discloses and claims polyurethane resins having more than one component.

In general the polyurethane resins are prepared by the reaction of an isocyanate with polyoxyalkylene compounds which contain an active hydrogen group to react with the isocyanate. The resins of the previously filed application were prepared using conventional isocyanates exclusively such as toluene diisocyanate where the isocyanate radical is available for immediate reaction with the active hydrogen group or groups on the polyoxyalkylene compounds. The use of these types of isocyanates required that the resin be of two components: one component having available isocyanate groups present and the other component having available active hydrogen groups present.

The resins of our present invention, however, differ from those described in our previously filed application mentioned above in that we now propose the use of blocked or masked isocyanates which will not have isocyanate radicals readily available for reaction so that the active hydrogen components and the isocyanates may be combined as one component. A blocked or masked isocyanate is usually a conventional isocyanate reacted with an excess of phenol, for instance. Blocked isocyanates normally remain unreactive below about 150° C. When the decomposition temperature of the blocked isocyanate is reached, the phenol is driven off and the isocyanate will react with active hydrogen compounds which are present. Thus, the polyoxyalkylene active hydrogen containing compounds may be mixed with the blocked isocyanate and remain stable until heat is applied to cure the polyurethane.

The first method of preparation of the novel polyurethane resins resistant to scale comprises combining a blocked or masked isocyanate with a polyether polyol and a monohydric polyether in a suitable solvent system to give a stable liquid one component resin coating.

The second method of preparation of these novel polyurethane resins comprises several steps. First, a monohydric polyether is reacted with two equivalents of a conventional (unblocked) diisocyanate. This adduct is then reacted with an excess of the polyether polyol, and this resultant mixture is combined with a blocked diisocyanate in a suitable solvent system to give a stable liquid one component resin coating.

Both resin mixtures are applied as a film to a surface. Heat is applied to "unblock" the isocyanate by driving away the phenol. The isocyanate then reacts with the active hydrogen containing polyoxyalkylene to form a solid coating. This process of reacting to form the solid coating is commonly referred to as curing.

In order to further supplement the understanding of the invention and to disclose the invention is close detail, the following additional information is submitted:

I. SCALE-RESISTANT SURFACES

This term as used in the instant invention refers to surfaces which have been made resistant to scale formation or build-up by protecting them with any of a group of novel polyurethane resins, which surfaces otherwise would tend toward accumulation thereon and/or adherence thereto of scale while in service in the presence of mineralized waters.

The amount of polyurethane coating required to give scale resistance is a variable dependent upon a number of factors. These include the quantity of pendant polyoxyalkylene chains attached to the polyurethane skeletal network, the average number of oxyalkylene groups per chain, the thickness and porosity of the coating, the presence or absence of "base coatings" or priming materials, the nature and concentration of the scale forming salts, and temperature of the mineralized waters. However, under so-called average conditions, a polyurethane resin formulated with 5–60 percent of the available hydroxyls composed of a polyoxyalkylene monohydric alcohol, one end of which is terminated by a radical non-reactive with isocyanates, wherein the pendant polyoxyalkylene chains contain from about two to 50, preferably from three to 30* (*These integers represent average numbers of groups in the polyoxyethylene chain.) oxyalkylene groups per chain, said coatings being in the form of one to four layers of the novel polyurethane resins, each layer being from about 1 to 3 mils thick, preferably undercoated by one to three layers of base-coating, each layer from 1 to 3 mils thick will effectively impart scale-resistance to surfaces which normally would tend to accumulate scale in the presence of mineralized waters.

While the success of this invention is not predicated on any particular mechanism, nor on the assignment of any particular structure to the subject scale-resistant surfaces, it is believed that said surfaces present to an aqueous environment containing potentially scale-forming minerals, or ions, a multiplicity of chemically attached pendant polyoxyalkylene chains, which chains attract and retain in close proximity to themselves through the influence of "hydrogen bonding" an envelope of water molecules; and, further, it is speculated that the "hydrated" surface so produced with its substantially immobilized boundary layer of water molecules performs as a barrier to the growth and/or attachment of scale nuclei or crystallites from the surrounding mineralized aqueous environment to the said surface.

The aforementioned pendant polyoxalkylene chains present in the surfaces of the subject novel, scale-resistant polyurethane resins may be represented by the following structural formula:

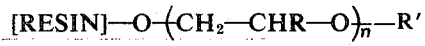

wherein $R$ is preferably selected from the group consisting of hydrogen, methyl or ethyl, and mixtures thereof; $R'$ is selected from alkyl, aryl, or other similar radicals, optionally substituted, and mixtures thereof; and $n$, which represents the average number of groups in the oxyalkylene chain, ranges from about two to about 50, preferably from three to 30. Pendant polyoxyalkylene groups of the type just described, may be created as chemically attached appendages to the polymeric skeletal network or an otherwise conventional polyurethane resin to produce the novel, scale-resistant polyurethane resin of this invention.

II. APPLICATION OF SCALE-RESISTANT COATINGS TO SUBSTRATE SURFACES

Application of the novel, scale-resistant polyurethane resin mixtures can be accomplished by spraying, painting, dipping, or other means. Each coat of the resin is subjected to an intermediate heat cure for about 3/4–3 hours at 220°–280° F., and after the desired number of coats have been applied, the coated article is subjected to a final cure to fully set the resin but without significantly altering the integrity of the pendant polyoxyalkylene chains in the resin.

The reaction temperature of the novel polyurethane resin will initially be the temperature at which the blocking agent (i.e., phenol) is driven off of the isocyanate being used. When the blocking agent breaks loose from he isocyanate the active hydrogens of the polyoxyalkylene material begin to react with the isocyanate. Usually this temperature is sufficiently high to adequately accelerate the curing reaction. For example, phenol blocking toluene diisocyanate is driven away at 150° C. If desired the curing temperature may be adjusted after the blocking agent has been driven off.

The preferred method of application involves successively applying and partially curing (1) a "base coat" of a suitable priming material, and (2) an outer coat of the novel polyurethane resin, followed by (3) a final thermal cure.

From one to four layers of the base-coat priming material, each about 1 to 3 mils thick, is first applied to the substrate by dipping, painting, spraying or the like, but preferably by spraying; each layer of the base-coat is allowed to dry or partially cure before the following one is applied. Partial curing of the base-coat priming material is accomplished by heating at 220°–280° F. for 0.5 to 1.5 hrs. Then several outer layers, preferably between one and four, made up of the novel polyurethane resin, each layer from about 1 to 3 mils thick, are applied and separately cured for 1½–3½ hrs. at 220°–280° F. Finally, the completed coating is cross-linked and consolidated by subjecting it to a post cure of about 1½–3½ hrs. at about 320°–400° F. Through trial and error it has been found that a total thickness of 6 to 12 mils of coatings is most effective.

While the base-coating technique is not essential in every instance to the successful application of the scale-resistant coatings of the instant invention, it may greatly improve bonding to the substrate of the novel, scale-resistant polyurethane resins, while at the same time acting to forestall possible diffusion or penetration of moisture through the outer polyurethane layers and, in the case where the substrate is metallic, resultant corrosion thereof. Nonrestrictive examples of base-coat priming materials satisfactory for the instant purpose include heat-curable resins of the alkyd, epoxy, epoxy-modified phenolic, and phenolic types; resins of the latter type, widely employed for the protection of oil field tubular goods against corrosion, were chosen for use in the examples hereinafter cited simply for reasons of economics and convenience. When this particular type of resin is used as the base-coat priming material in the hereinabove described application and coating procedure, each layer is heat-cured for about 3/4 to 3 hrs, at about 220° to 280° F.

If desired, intermediate layers made up of a mixture of the primer and the novel, scale-resistant polyurethane resin may be used to serve as a transition zone providing interpenetration and to insure strong (chemical) bonding between the base-coat priming layers and the outer layers of novel, scale-resistant polyurethane.

III. INGREDIENTS AND CONDITIONS FOR FORMULATING NOVEL SCALE-RESISTANT POLYURETHANE RESINS

A. Polyisocyanates and Blocked Polyisocyanates

The blocked isocyanates useful in the polyurethane resins of our invention have as the isocyanate component polyisocyanates, preferably aromatic polyisocyanates, although aliphatic polyisocyanates are also suitable. For instance, the reaction product of toluene diisocyanate with an excess of phenol is typical of readily available blocked isocyanates suitable for use in our invention. Also, 1,5-naphthalene diisocyanate, m- and p-phenylene diisocyanates, 4,4-diphenylisopropylidine diisocyanate, 4,4'-diphenylsulfone diisocyanate, 4,4'-diphenylmethane diisocyanate, and 4,4',4"- triphenylmethane triisocyanate as well as certain mixtures thereof are suitable isocyanates components, for example. Included among active hydrogen compounds which have found use as blocking agents are hydrogen cyanide, ethyl malonate, acetylacetone, hydroxylamine, aryl mercaptans, monomethylaniline, diphenylamine, phenols, α- pyrrolidone, and caprolactam.

B. Polyols

Conventional polyols suitable for the purpose of providing the polymeric backbone or skeletal structure of the novel, scale-resistant polyurethane resins described above are exemplified by polyhydric alcohols having an hydroxyl functionality of about three or greater which have been polyoxyalkylated so that an average of about two to about 50 oxyalkylene groups,

$-(CH_2-CHR-O)-$ , where R = alkyl, have been added to each hydroxyl group. An example of this type of polyether polyol is the ethylene oxide adduct of glycerol,

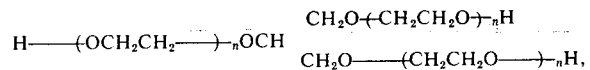

wherein $n = 2$ to 50. Also, the propylene oxide adduct of glycerol of the same general description is suitable. It is also acceptable to use mixed alkylene oxide adducts of polyhydric alcohols. Suitable alkylene oxides include, for example, ethylene oxide, propylene oxide and butylene oxide to name only a few. Polyhydric alcohols useful as starting materials or initiators for alkylene oxide addition to form the polyols useful in our invention are polyhydric alcohols having a functionality of three or more preferably about three to about six. Typical examples of such polyhydric alcohols include glycerol, trimethylopropane, erythritol, pentaerythritol, arabitol and mannitol. The method of reacting the polyhydric alcohols and alkylene oxides to attain the polyols useful in our invention is well known to those skilled in the art.* (* The conditions of oxyalkylation are copiously described in the literature (i.e., Kirk Othmer, Encylcopedia of Chemical Technology, 1st Edition) as well as the Patent Literature. See copending application Ser. No. 57,788, filed 7/23/70.)

In fact, many suitable oxyalkylated polyol adducts of various molecular weights are commercially available wherein the polyol has a hydroxyl contact of about three or more.

C. Monohydric Polyethers

Polyethers of the type suitable for use in formulating novel, scale-resistant polyurethane resins of our invention are characterized by polyoxyalkylene chains terminated at one end by an alkyl, aryl, or other appropriate substituent which is nonreactive toward isocyanate functional groups, and terminated at the other end by a hydroxyl group which, upon reaction with the isocyanate groups in the resin reaction mixture in excess of those required for complete reaction with the polyol component, ultimately provide the requisite pendant polyoxyalkylene chains in the resin mixture. Such polyethers are of the general structural formula,

$R-O-(CH_2-CHR'-O)_n-H$, wherein R = alkyl, aryl, or other radical which is nonreactive with isocyanate functional groups, R' = alkyl, and $n$ = about three to about 50; examples of such polyethers are the methoxy, propoxy, and phenoxy polyethylene glycols, polypropylene glycols, polyglycidyl ethers, and the like.

D. Catalysts

The reactions of the polyether polyol and monohydric polyethers with the isocyanates to form the scale-resistant polyurethane coatings of our invention may be accelerated and improved by the addition of a catalyst. Suitable catalysts are well known in the art and include such components as stannous octoate, lead octoate, and dibutyltin dilaurate.

E. Optional Additives

To the extent that their incorporation does not substantially affect the scale-resistant properties of the subject novel, scale-resistant polyurethane resins, various materials other than the hereinabove described "active" ingredients may optionally be added to the resin formulations to impart certain supplemental special properties for particular in-service usages when deemed desirable. For example, suitable optional additives may be employed to impart such supplemental properties to the subject novel resins as pigments for color identification, "fillers" for enhancement of such physical properties as temperature stability, abrasion resistance, resilience, cohesiveness, and the like, as well as for economic advantages, and reinforcing agents for improved mechanical strength, particularly in the fabrication of scale-resistant articles of manufacture.

The use of such optional additives as well known in the art, and anyone skilled in the art of resin technology could determine which, if any, of such additives could be used advantageously in connection with the novel polyurethane resins of this invention.

IV. EVALUATION OF SURFACE SCALE RESISTANCE

Clearly, the preferred method of determining the ability of a surface to resist scale deposition is by exposure to actual field-operating conditions. However, inasmuch as full-scale tests in the field are both costly and time consuming, the screening procedure described below was employed since it has been found generally by experience over a period of years to correlate well with field results in the evaluation of scale inhibitors.

Rotors 5.5 inches in length, 0.84 inch in diameter, and having a hemispherically rounded tip, are constructed from cold-rolled mild steel stock so that they can be heated by a quartz-encased coil heater which fits inside the rotor. After fabrication, the steel rotors are sand-blasted to roughen the external surface. The steel rotor is then cleaned by the use of solvents, detergents, and abrasive cleaners to provide a bare surface scrupulously free of oil, soil, or scale of any kind. The resin to be evaluated is then coated on the cleaned rotors by the procedures hereinabove described in II, "Application of Scale-Resistant Coatings to Substrate Surfaces."

Except for the rotor design, the evaluation procedure used is that described in the journal "Corrosion", Vol. 17, No. 5, pp. 232t–236t (May 1961), and by U.S. Pat. No. 3,488,289. The test functions by allowing a deposit of gypsum (calcium sulfate scale) from a supersaturated solution thereof to slowly accrete on the surface of a heated, rotating cylinder to the extent that the surface of the cylinder is by nature scale prone. After the test, the rotor is carefully rinsed in acetone and allowed to dry under a heat lamp. The adhering scale, if any, is carefully scraped from the rotor and weighed. The weight of scale deposited on an uncoated metal rotor, used as a control is compared to that deposited on rotors coated with conventional resins and to that deposited on rotors coated with the novel polyurethane resins.

V. SCALE-RESISTANT ARTICLES OF MANUFACTURE

Scale-resistant articles of manufacture which may be prepared from the novel, polyurethane resins described herein include conduits, membranes, vessels, and the like which may be subject to service in the presence of mineralized waters where, if said articles were manufactured from conventional, scale-prone substances, mineral scaling would occur. Such manufactured articles might include castings, composites, and laminates of the novel resins with or without inclusion of optical additives such as reinforcing agents and fillers as described above.

The following examples are illustrative of the production of typical scale-resistant polyurethane resins in accordance with the present invention. It will be understood that similar reactants can be utilized, proportions modified, temperatures, times, concentrations, and other conditions altered, all within the guiding principles taught herein, without departing from the essential teachings herein disclosed.

Example I. A One-Component Polyurethane Resin

A 16.71 g. charge of a blocked isocyanate prepared from toluene diisocyanate and phenol was dissolved in 30.0 ml. of a toluene/ethyl acetate solvent mixture by stirring with heating at 70° C. When dissolution was complete, 11.3 g. of a 400 molecular weight propylene oxide adduct of glycerol and 11.25 g. of a monohydric polyether of the general formula $CH_3O-(CH_2-CH_2O)_{16}H$ were added and the stirring and heating continued for 0.5 hour. After cooling, 0.15 g. of dibutyl tin dilaurate was added and the resin mixture mixed well.

Example II. A One-Component Polyurethane Resin

A charge of 5.22 g. of tolylene diisocyanate (TDI) was dissolved in 20.0 ml. of the solvent mixture of Example I and placed in a dry 250 ml. 3-neck flask equipped with a dropping funnel, condenser, and nitrogen purge. Dry nitrogen gas was allowed to low through the system during the entire reaction period. A solution of 22.5 g. of a monohydric polyether of the general formula $Ch_3O-(CH_2-CH_2O)_{16}H$ in the toluene/ethyl acetate solvent mixture was then added dropwise in the TDI soln. while heating with stirring at 140° F. This mixture was allowed to react for two hours. Following this time, 26.6 g. of a 400 molecular weight propylene oxide adduct of glycerol was added and stirring continued for an additional two hours. A charge of 25.05 g. of a blocked isocyanate prepared from toluene diisocyanate and phenol was then added with stirring until dissolution was complete. The resin mixture was cooled to room temperature and 0.25 g of dibutyl tin dilaurate mixed in.

Example III. Coating and Curing Procedure

The coating and curing procedure used for both resins was the same. A conventional phenolic resin (Bakelite BKS 2600, filled on an equal weight basis with an 80/20 mixture of Barytes and iron oxide) was applied to a total thickness of 4 mils. This thickness was accomplished by applying four light coats of the phenolic with air drying after the first and third coats and oven curing for 0.5 hour at 250° F. after the second and fourth coats. Two light coats of the appropriate polyurethane resin soln. were then applied with air drying between coats. This coating was then cured for 2 hours at 220° F. and 1 hour at 350° F.

Example IV. Scale-Resistant Testing

The two resin coatings were evaluated for scale resistance by the method detailed in the specification. No adherent mineral scale formed during the tests.

Example V. Shelf Life Test

Portions of the two resins were placed in bottles and stored in the laboratory. After two months, no observable change has been found in the physical condition of the resins.

We claim:

1. A process for imparting scale resistance to a surface comprising:
    applying a liquid coating of a combination of a blocked isocyanate, a polyether polyol derived from polyhydric alcohols having a hydroxyl functionality of about three or greater which have been polyoxyalkylated so that an average of about two to 50 oxyalkylene groups, $-(CH_2-CHR-O-)$, where R = alkyl, have been added to each hydroxyl group and a monohydric polyether in proportions capable of forming a solid coating upon reacting together in an inert solvent system to a surface,
    heating the coating to a temperature sufficient to drive the blocking agent from the isocyanate, and
    heating the coating to a temperature sufficient to cause the ingredients to react essentially to completion.

2. The process of claim 1 wherein the surface is metallic.

3. The process of claim 1 wherein the surface is nonmetallic.

4. The process of claim 1 where the blocked polyisocyanate has an aromatic nucleus attached to the isocyanate radical.

5. The process of claim 4 wherein the blocked polyisocyanate is toluene diisocyanate reacted with phenol.

6. The process of claim 1 wherein the polyether polyol is an alkylene oxide adduct of a trihydric alcohol.

7. The process of claim 1 wherein the monohydric polyether is represented by the formula

wherein R = alkyl, aryl, or other radical which is non-reactive with isocyanate functional groups, R' = alkyl and n = three to 50.

8. The process of claim 1 wherein the reaction between the isocyanate radicals and active hydrogens on the polyether polyol and monohydric polyether is catalyzed by the addition of a catalyst.

9. A process for imparting scale resistance to a surface comprising applying a liquid coating of a resin prepared by the reaction of a monohydric polyether with two equivalents of a conventional diisocyanate and in turn reacting said resin with an excess of a polyether polyol derived from polyhydric alcohols having a hydroxyl functionality of about three or greater which have been polyoxyalkylated so that an average of about two to 50 oxyalkylene groups, $+CH_2-CHR-O+$, where R = alkyl, have been added to each hydroxyl group and in turn combining this reacted mixture with a blocked diisocyanate and an inert solvent system in proportions capable of forming a solid coating upon reacting, heating the coating to a temperature sufficient to drive the blocking agent from the isocyanate and, maintaining sufficient heat on the coating to cause the reaction between the isocyanate and the polyol to proceed to completion.

10. The process of claim 9 wherein the surface is metallic.

11. The process of claim 9 wherein the surface is non-metallic.

12. The process of claim 9 where the conventional isocyanate is toluene diisocyanate.

13. The process of claim 9 where the blocked diisocyanate has an aromatic nucleus attached to the isocyanate radical.

14. The process of claim 13 wherein the blocked polyisocyanate is toluene diisocyanate reacted with phenol.

15. The process of claim 9 wherein the polyether polyol is an alkylene oxide adduct of a trihydric alcohol.

16. The process of claim 9 wherein the monohydric polyether is represented by the formula

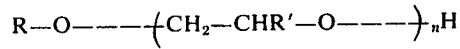

wherein R = alkyl, aryl, or other radical which is non-reactive with isocyanate functional groups, R' = alkyl and $n$ = three to 50.

17. The process of claim 9 wherein the reaction between the isocyanate radicals and active hydrogens on the polyether polyol and monohydric polyether is catalyzed by the addition of a catalyst.

18. A process for imparting scale-resistance to substrate surfaces normally susceptible to mineral scale formation when in contact with mineralized water, comprising the steps of:

successively applying to said scale-susceptible substrate surfaces a base coat of a curable resin priming material, and partially curing said priming material, applying at least one outer coating of polyurethane resin comprising a blocked isocyanate, a polyether polyol derived from polyhydric alcohols having a hydroxyl functionality of about three or greater which have been polyoxyalkylated so that an average of about two to 50 oxyalkylene groups, $+CH_2-CHR-O+$, where R = alkyl, have been added to each hydroxyl group, and a monohydric polyether in proportions capable of forming a solid coating having pendant polyoxyalkylene chains upon reacting together, and subjecting each said coat to an intermediate heat cure, followed by a final heat curing of the coatings such that said coatings possess good adhesion to said substrate, stability of in-service environmental conditions, but without significant loss of the integrity of the pendant polyoxyalkylene chains in said polyurethane resin.

* * * * *